(12) United States Patent
Abe et al.

(10) Patent No.: US 9,111,199 B2
(45) Date of Patent: Aug. 18, 2015

(54) GRADATION-PATTERN CREATION PROGRAM

(71) Applicant: MUTOH INDUSTRIES LTD., Tokyo (JP)

(72) Inventors: Yoichi Abe, Tokyo (JP); Tomoo Nakajima, Tokyo (JP)

(73) Assignee: MUTOH INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/387,328

(22) PCT Filed: Dec. 14, 2012

(86) PCT No.: PCT/JP2012/082524
§ 371 (c)(1),
(2) Date: Sep. 23, 2014

(87) PCT Pub. No.: WO2013/145462
PCT Pub. Date: Oct. 3, 2013

(65) Prior Publication Data
US 2015/0049349 A1   Feb. 19, 2015

(30) Foreign Application Priority Data

Mar. 30, 2012   (JP) .................................. 2012-078984

(51) Int. Cl.
*G06K 15/02*   (2006.01)
*G06F 3/12*   (2006.01)
(Continued)

(52) U.S. Cl.
CPC .......... *G06K 15/1848* (2013.01); *G06K 15/023* (2013.01); *G06T 11/203* (2013.01); *G06T 11/60* (2013.01)

(58) Field of Classification Search
None
See application file for complete search history.

(56) References Cited

U.S. PATENT DOCUMENTS 5,051,820 A * 9/1991 Sasaki .......................... 358/524
5,828,461 A * 10/1998 Kubo et al. ................... 358/296
(Continued)

FOREIGN PATENT DOCUMENTS

JP   5-323124   12/1993
JP   7-264392   10/1995
(Continued)

OTHER PUBLICATIONS

International Search Report issued Jan. 22, 2013 in International Application No. PCT/JP2012/082524.

*Primary Examiner* — Marcus T Riley
(74) *Attorney, Agent, or Firm* — Wenderoth, Lind & Ponack, L.L.P.

(57) ABSTRACT

A gradation pattern preparation program by which a complicated gradation pattern can be prepared easily, wherein a computer is caused to function as: a vertical and horizontal printing density control line generation means for displaying, on a campus face, vertical and horizontal printing density control lines in a net-like manner, a vertical cross section line generation means for displaying a cross section image of the selected vertical printing density control line as a vertical cross section line on a vertical cross section line display screen, a horizontal cross section line generation means for displaying a cross section image of the selected horizontal printing density control line as a horizontal cross section line on a horizontal cross section line display screen, a printing density control point generation means for displaying, on the respective vertical and horizontal cross section lines, printing density control points for editing the respective vertical and horizontal cross section lines, and a printing density control point shift means for changing, in accordance with the shift of the printing density control points, heights to reference lines of the respective vertical and horizontal cross section lines.

3 Claims, 9 Drawing Sheets

(51) Int. Cl.
*G06T 11/60* (2006.01)
*G06T 11/20* (2006.01)

(56) References Cited

U.S. PATENT DOCUMENTS 6,097,510 A 8/2000 Kanno et al.
8,169,627 B2 * 5/2012 Kudo et al. .................. 358/1.13

2003/0030825 A1 * 2/2003 Kubo et al. .................... 358/1.9
2011/0249277 A1 * 10/2011 Kato et al. .................... 358/1.1

FOREIGN PATENT DOCUMENTS

JP 2003-35802 2/2003
WO 2011/101904 8/2011

* cited by examiner

GRADATION-PATTERN CREATION PROGRAM

TECHNICAL FIELD

The present invention relates to a computer program for preparing a printable gradation pattern.

BACKGROUND ART

Conventionally, it has been known to prepare a light guide plate used for a liquid crystal TV (television) for example by printing with an inkjet printer.

A light guide plate is composed of a transparent acrylic plate. A light guide plate is prepared by printing a gradation pattern having a color (white) for light reflection and diffused reflection on this acrylic plate. The gradation pattern printed on the printing face of the light guide plate is prepared using commercially-available drawing software with reference to the brightness distribution required for the light guide plate.

SUMMARY OF THE INVENTION

In order to prepare a light guide plate so that a desired brightness distribution is obtained, a gradation pattern for printing requires a complicated color density change. Thus, it has been not easy to prepare a complicated gradation pattern using commercially-available software.

It is an objective of the present invention to provide a gradation pattern preparation program by which a complicated gradation pattern can be prepared easily.

Means for Solving the Problem

In order to achieve the above objective, the present invention is a gradation pattern preparation program to prepare a printable gradation pattern on a campus region set on a computer screen, wherein a computer is caused to function as:

a campus setting means for defining a region on which the gradation pattern is prepared, a vertical and horizontal printing density control line generation means for displaying, on a campus face, vertical and horizontal printing density control lines in a net-like manner, a vertical cross section line generation means for displaying a cross section image of the selected vertical printing density control line as a vertical cross section line on a vertical cross section line display screen, a horizontal cross section line generation means for displaying a cross section image of the selected horizontal printing density control line as a horizontal cross section line on a horizontal cross section line display screen, a printing density control point generation means for displaying, on the respective vertical and horizontal cross section lines, printing density control points for editing the respective vertical and horizontal cross section lines, and a printing density control point shift means for changing, in accordance with the shift of the printing density control points, heights to reference lines of the respective vertical and horizontal cross section lines.

According to the present invention, the heights to the reference lines of the respective vertical and horizontal cross section lines define the color shading of the gradation pattern along corresponding vertical and horizontal printing density control lines.

Also according to the present invention, the printing density control points function as a reference point by which the color shading can be specified on the respective vertical and horizontal cross section lines and are provide with a handle that can be moved in an up-and-down direction with reference to the reference line.

Effect of the Invention

According to the present invention, a vertical cross section line and a horizontal cross section line corresponding to the respective vertical and horizontal printing density control lines displayed on the campus can be set by an operation of the handle to have an arbitrary curve to thereby easily prepare a gradation pattern composed of a desired color shading. Furthermore, a work such as a minute adjustment can be also performed easily.

EMBODIMENT FOR CARRYING OUT THE INVENTION

Figure 1:
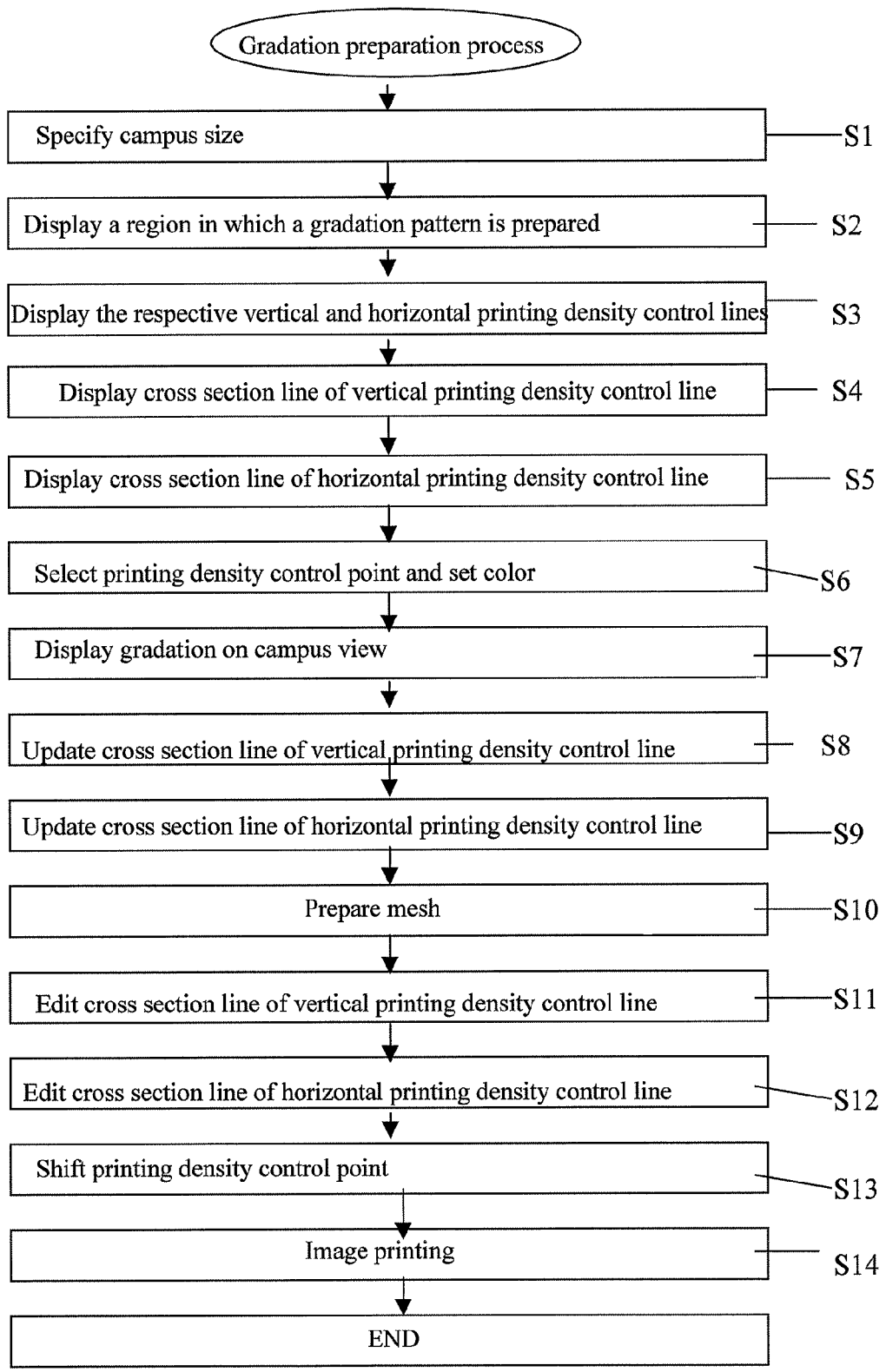
FIG. 1 is a flowchart illustrating the operation of the present invention.
Figure 2:
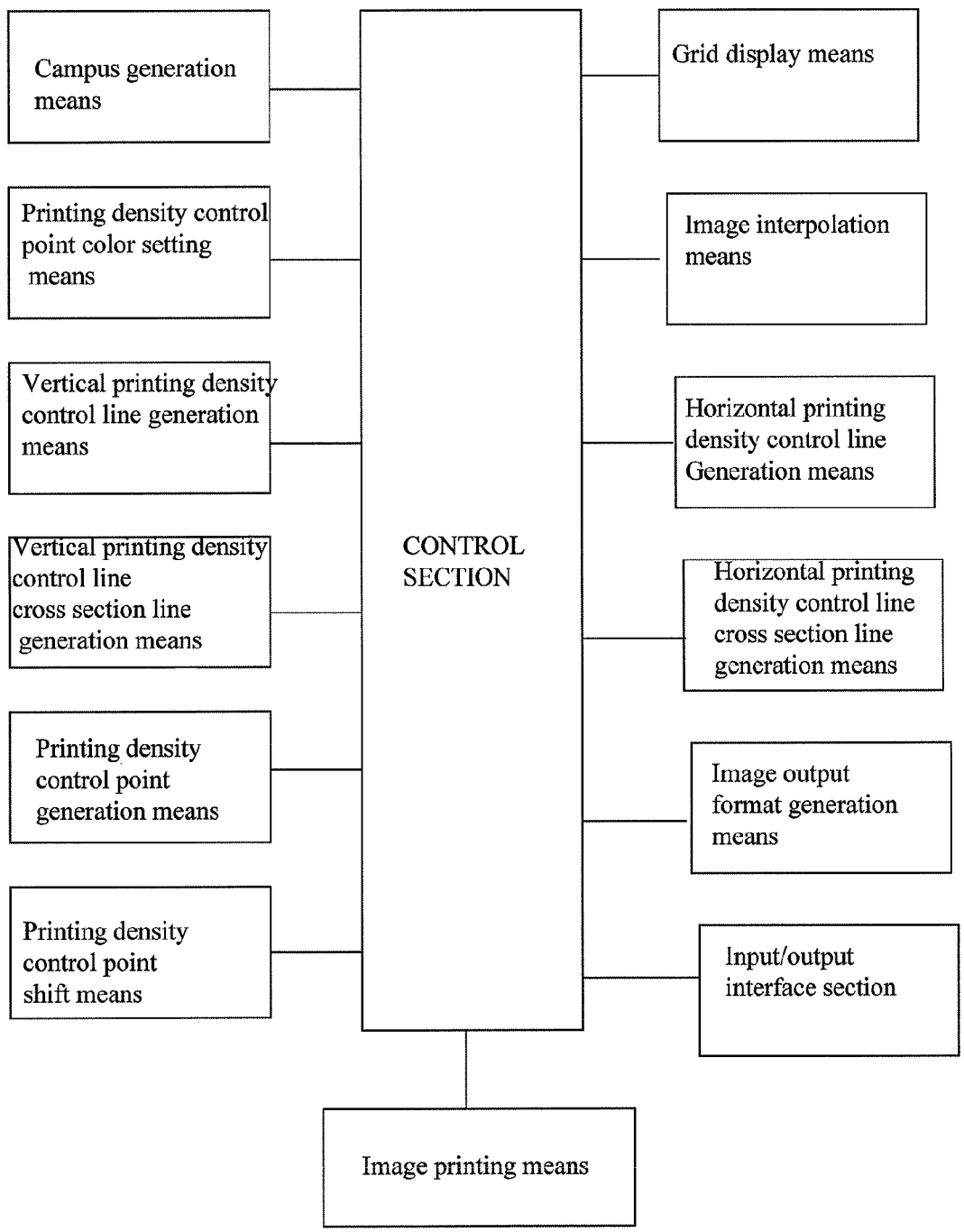
FIG. 2 is a block diagram illustrating the present invention.

The following section will describe the configuration of the present invention in detail with reference to the attached drawings.

A program according to the present invention is composed of: a campus generation means 2 for specifying a region in which a gradation pattern is prepared; a printing density control point color setting means 6 for displaying the shading color of the printing density control point selected through a printing density control point color setting dialogue 4; a vertical printing density control line generation means 12 for displaying a vertical printing density control line 10 on a campus 8; a horizontal printing density control line generation means 16 for displaying a horizontal printing density control line 14 on the campus 8; a vertical printing density control line cross section line generation means 20 for displaying a cross section line 18 of the vertical printing density control line 10; a horizontal printing density control line cross section line generation means 24 for displaying a cross section line 22 of the horizontal printing density control line 14; a printing density control point generation means 28 for displaying printing density control points 26, 50, and 52 for editing the vertical and horizontal printing density control lines 10 and 14 as well as the respective cross section lines 18 and 22 through a campus screen 8a and cross section line display screens 34 and 36; a printing density control point shift means 42 for changing, in accordance with the shift of the printing density control points, the heights of the respective vertical and horizontal cross section lines to a reference line; an image interpolation means 30 for limiting pixels calculated based on image interpolation; an image output format generation means 32 for converting data to have a data format for outputting an image; a grid display means 40 for allowing a grid 38 to be displayed on the campus screen 8*a* as well as the cross section line display screens 34 and 36; an input/output interface section 44; an image printing means 46 for printing a campus region with a printer; and a control section 48 for controlling them.

This program is used by being installed in a computer.

Next, the operation of this program installed in the computer will be described in detail with reference to the flowchart shown in FIG. 1.

Figure 3:
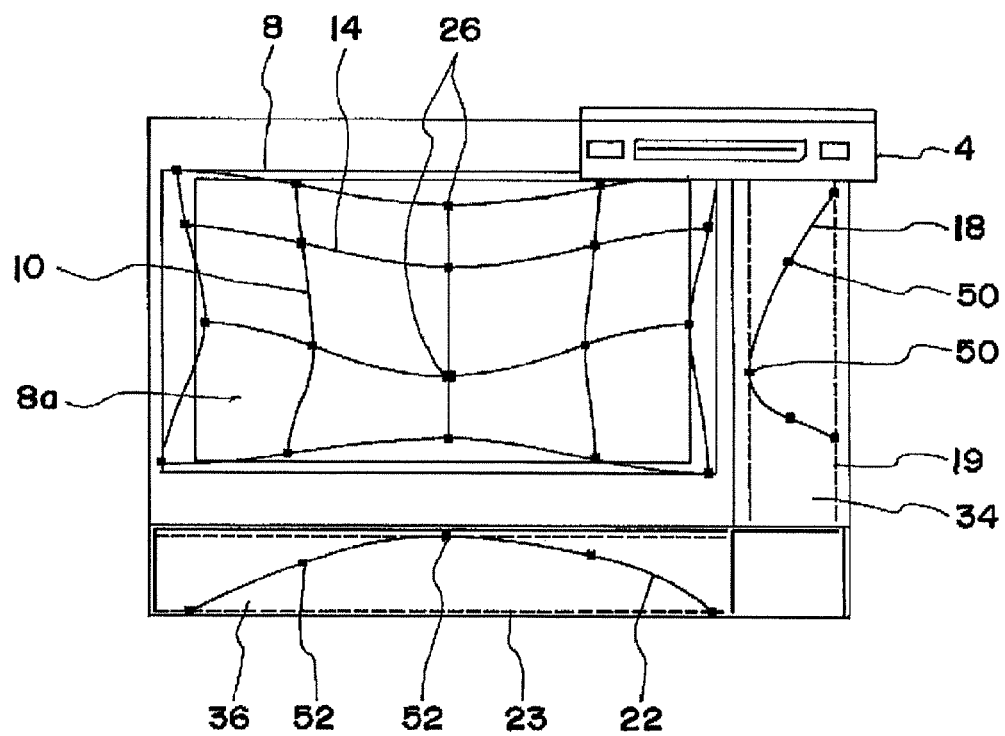
FIG. 3 illustrates the present invention.

This program is a tool to prepare a gradation pattern composed of a color shading to output and print an image so that the gradation shading can be edited in an arbitrary manner. The term "gradation" means a form in which the color shading changes gradually. The term "gradation pattern" means printed image data composed of a color shading. In the gradation pattern, the color density corresponds to a dot or pixel printing density and the color density can be changed in a range from 0% to 100%. In an actual printing, a position to be printed is specified based on the printer resolution and printing can be performed within an arbitrary range from 0 to 100% for example within the range. In the image displayed on the computer screen shown in FIG. 3, the campus 8 shows a region in which a gradation pattern is prepared. Although the setting is generally within a range of 0% to 100%, the upper limit range can be specified because 100% or more can be set if the same position is subjected to printing two times.

Figure 4:
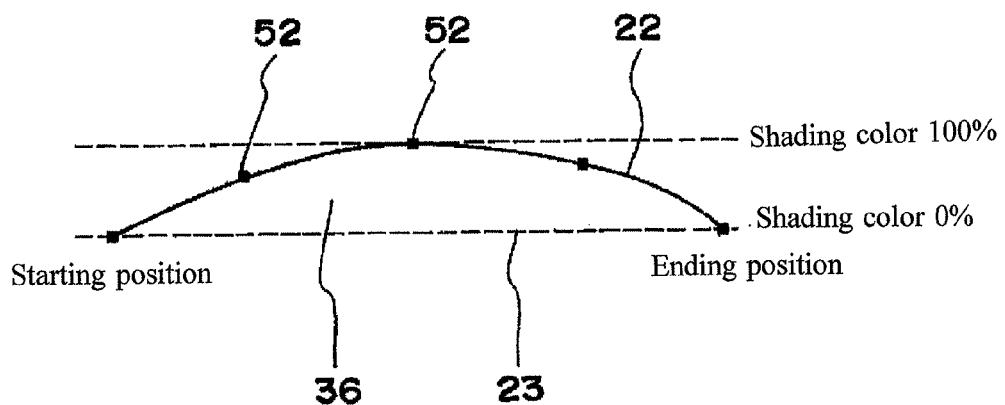
FIG. 4 illustrates the present invention.

The printing density control point 26 functions as a reference point based on which a shading color can be specified and includes a movable handle. The printing density control lines 10 and 14 illustrate the vertical and horizontal printing density control lines of a mesh screen. The printing density control point color setting dialogue 4 is used to set the color of the selected printing density control point 26 (any one of CMYK). The cross section lines 18 and 22 of the printing density control lines 10 and 14 show the cross section images of the selected vertical and horizontal printing density control lines 10 and 14. As shown in FIG. 4, the height of the cross section line 22 to the reference line 23 shows a pixel height. This pixel height determines a shading color.

In this embodiment, K (black) among CMYK is used. The shading of black (i.e., density) is displayed by the height of the cross section line in a range from 0% to 100%. The left end of the reference line 23 shows a print starting position and the right end shows a print ending position. The same applies to the cross section line 18. The cross section line 18 of the vertical printing density control line 10 is a projection view of the printing density control line 10 to a plane that is vertical to the plane of the campus 8 and that is parallel to the printing density control line 10. The cross section line 22 of the horizontal printing density control line 14 is a projection view of the printing density control line 14 to a plane that is vertical to the plane of the campus 8 and that is parallel to the printing density control line 14. The gradation can be changed by changing the heights of the cross section lines 18 and 22.

Figure 5:
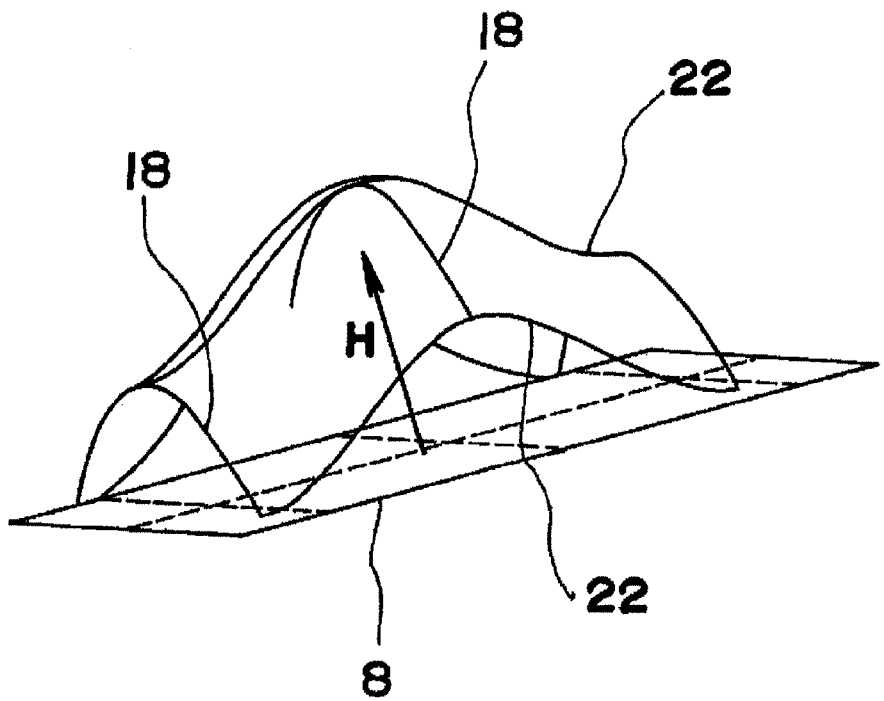
FIG. 5 illustrates the present invention.
Figure 6:
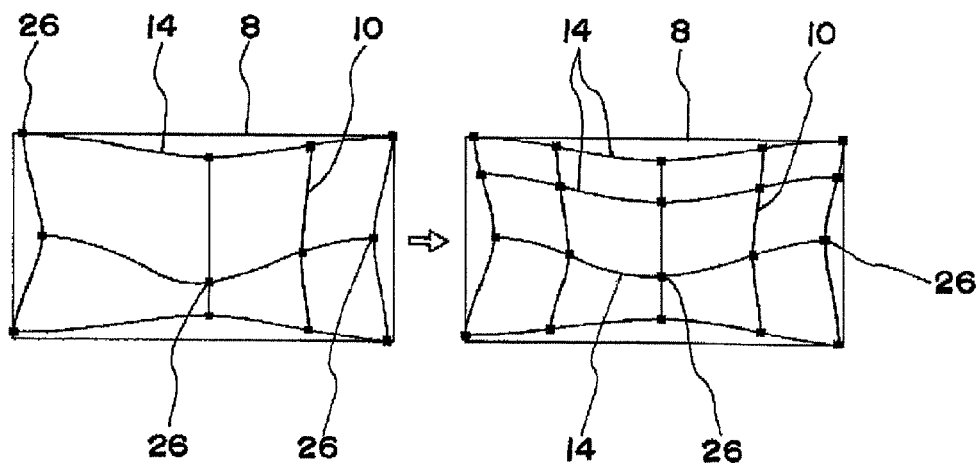
FIG. 6 illustrates the present invention.
Figure 9:
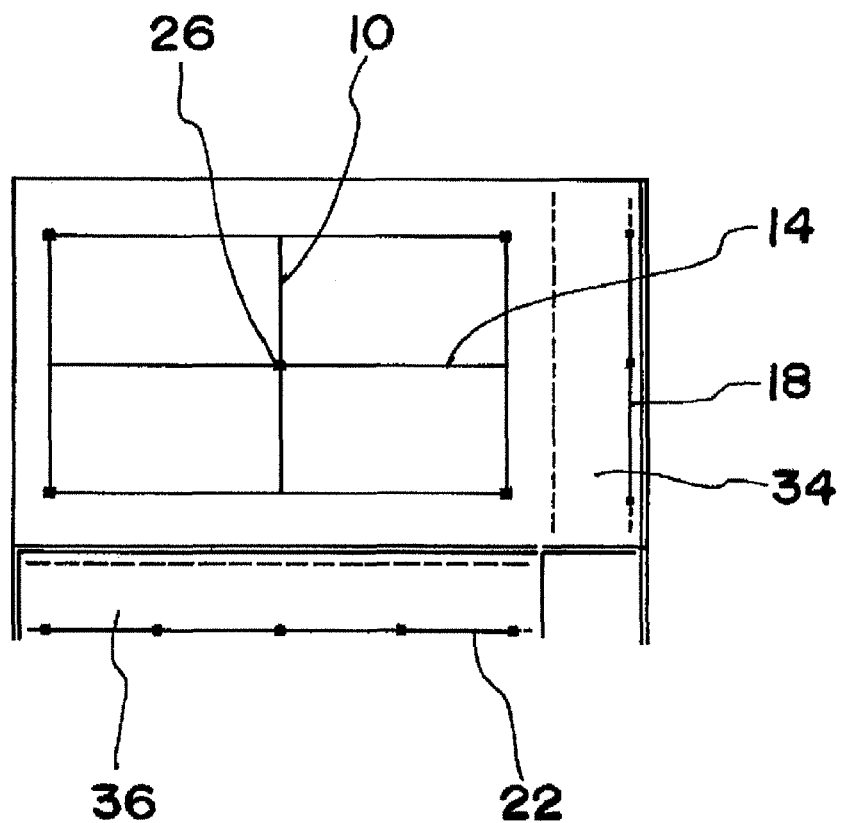
FIG. 9 illustrates the present invention.

In this program, the gradation color preparation is configured so that, as shown in FIG. 5, the shading color is determined based on the pixel height H on a plane on the campus 8. When the gradation preparation process is started, the campus generation means 2 in Step S1 firstly sets the size of the campus 8 based on an instruction from an operator and displays the region of the campus 8 (Step 2). During this, as shown in FIG. 9, the campus 8 displays the respective vertical and horizontal printing density control lines 10 and 14 (Step 3)

Figure 10:
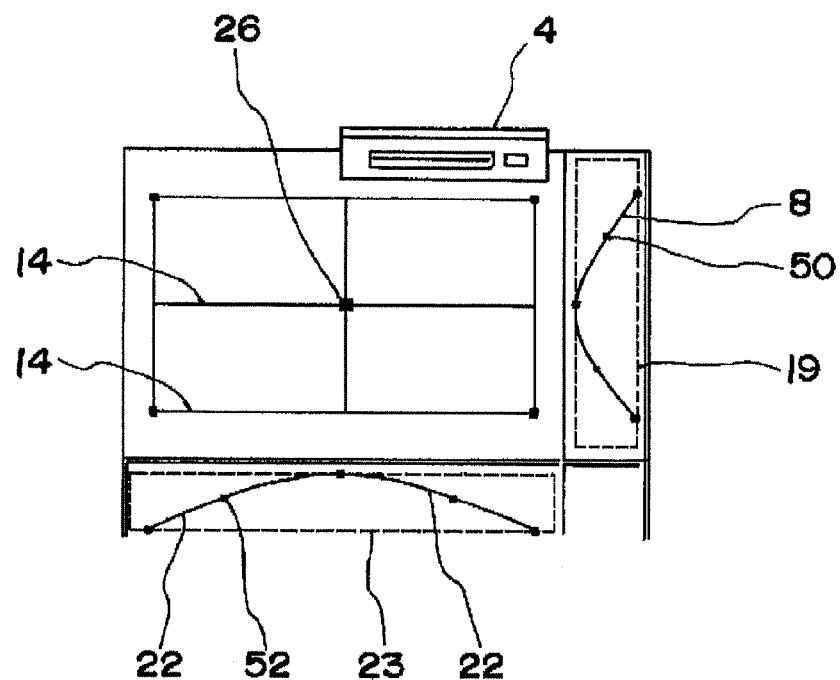
FIG. 10 illustrates the present invention.

The vertical cross section line display screen 34 displays the cross section line 18 of the vertical printing density control line 10. The horizontal cross section line display screen 36 displays the cross section line 22 of the horizontal printing density control line 14 (Step S5). The respective cross section lines 18 and 22 are initially displayed at a 0% position as shown in FIG. 9. Next, based on the instruction from the operator, as shown in FIG. 10, the printing density control point color setting means 6 is used to select the printing density control point 26. The printing density control point color setting dialogue 4 is used to set the color, thereby displaying the shading color of the printing density control point 26 set through the printing density control point color setting dialogue 4.

Figure 11:
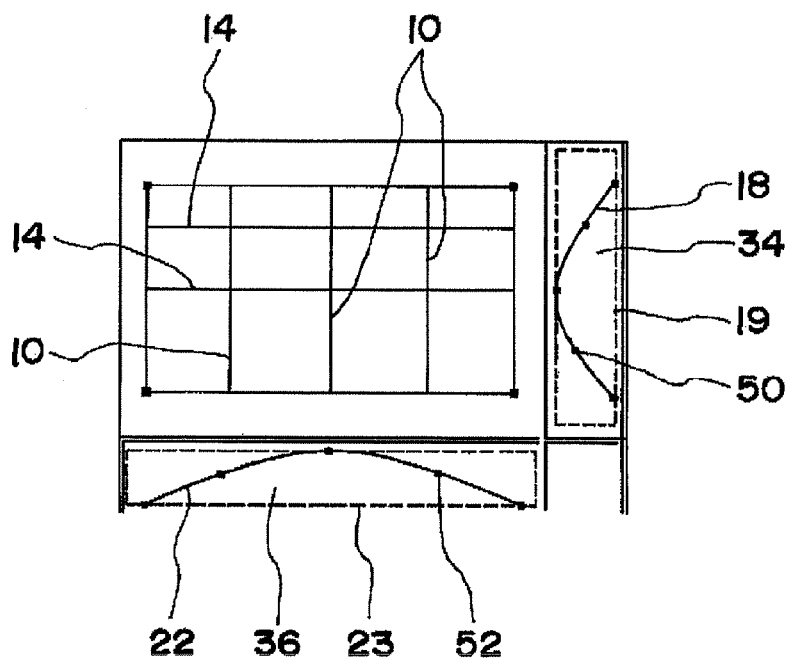
FIG. 11 illustrates the present invention.
Figure 12:
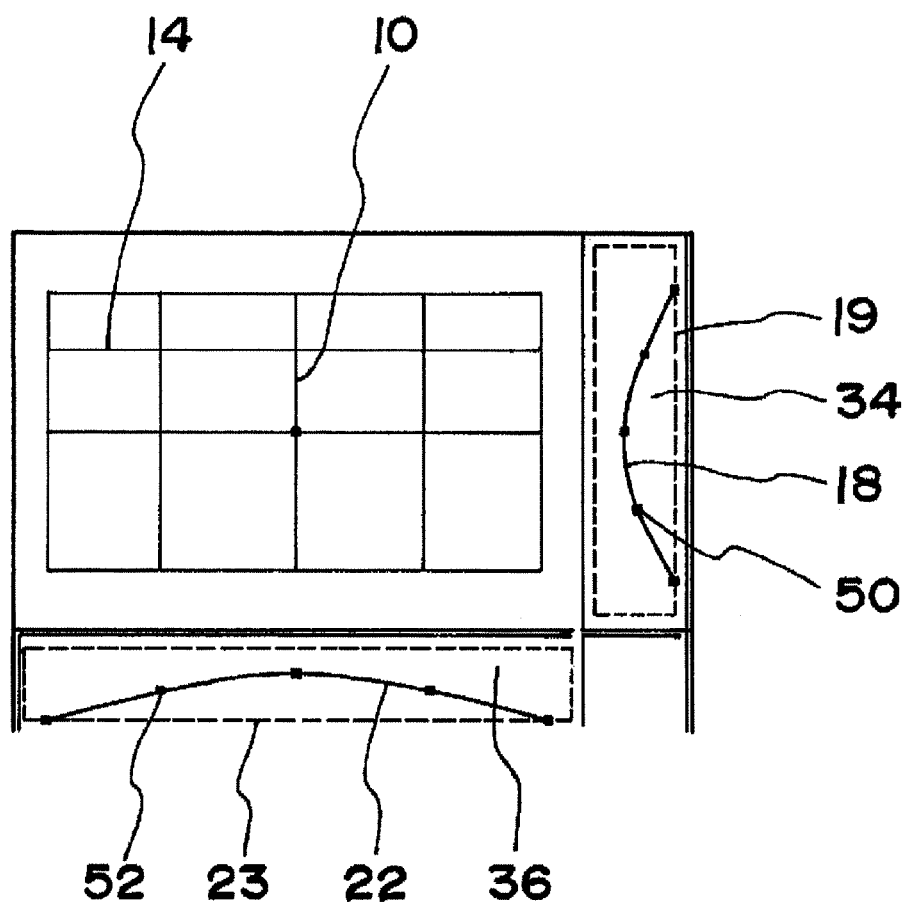
FIG. 12 illustrates the present invention.

Furthermore, the campus screen 8*a* displays a gradation image (not shown) (Step S7) to update the cross section line 18 of the vertical printing density control line 10 and the cross section line 22 of the horizontal printing density control line 14 (Steps S8 and S9). Next, as shown in FIG. 11, based on the instruction from the operator, the printing density control lines 10 and 14 are displayed at an arbitrary specified position of the campus 8 (Step S10). Next, based on the operation from the operator, the cross section line 18 of the vertical printing density control line 10 and the cross section line 22 of the horizontal printing density control line 14 are edited. As shown in FIG. 12, when the printing density control lines 10 and 14 of the campus 8 are selected, the cross section lines 18 and 22 of the selected printing density control lines 10 and 14 are displayed and the cross section lines 18 and 22 display the printing density control points 50 and 52.

Figure 7:
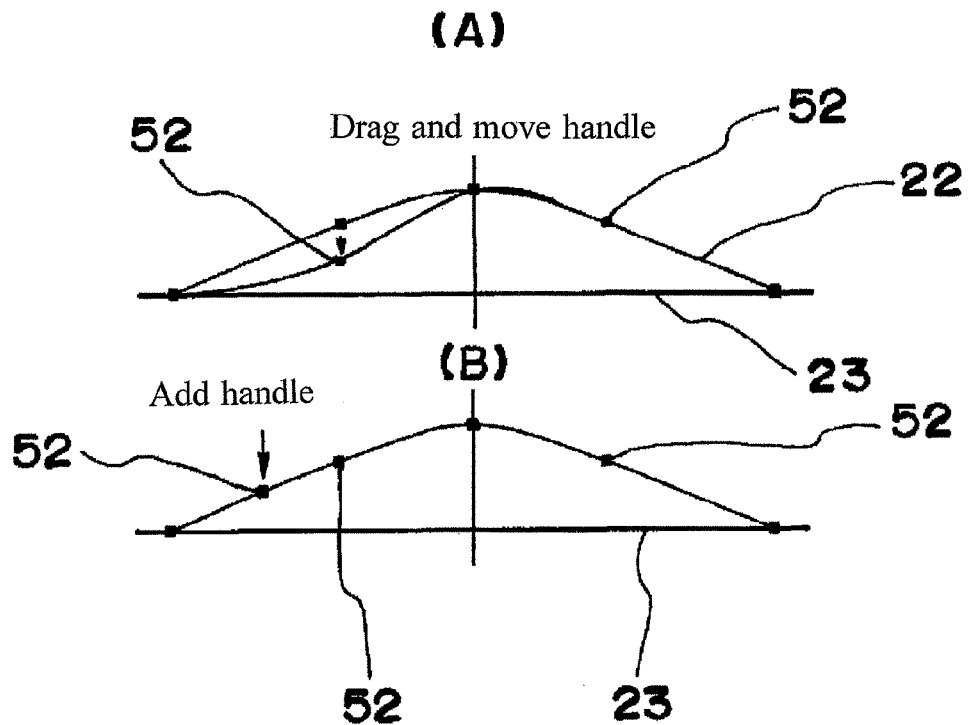
FIG. 7 illustrates the present invention.

When the handles of the desired printing density control points 50 and 52 are dragged and are moved in an up-and-down direction, the heights of the cross section lines 18 and 22 are changed as shown in FIG. 7(A) to update the gradation pattern of the campus 8 (Steps 11 and 12). As shown in FIG. 7(B), the printing density control point 52 can be added/deleted. The same applies to the printing density control points 50 and 26.

Figure 8:
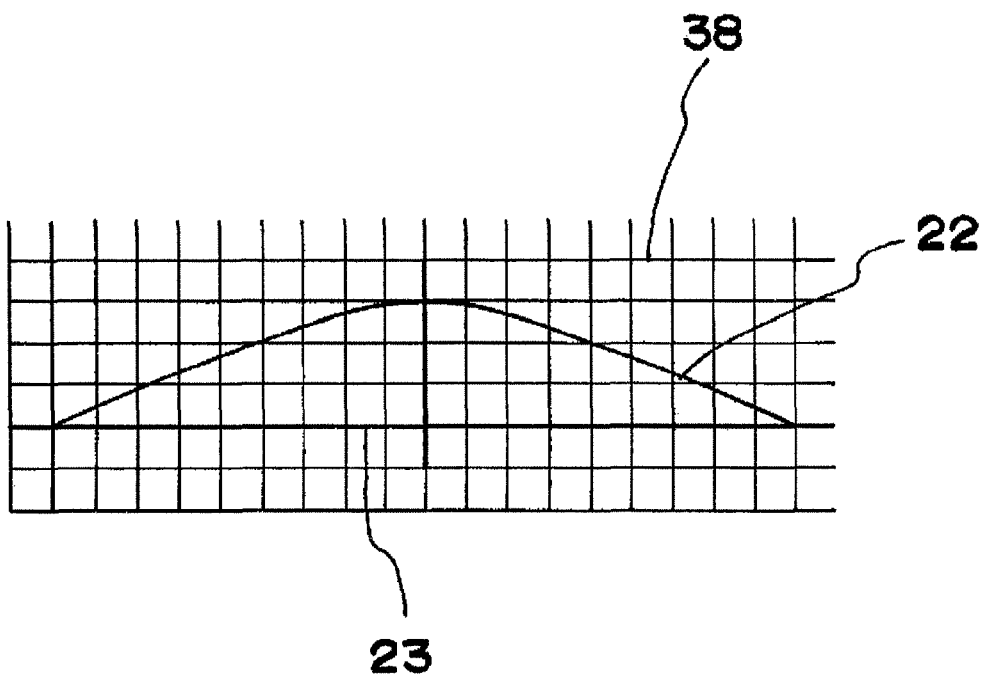
FIG. 8 illustrates the present invention.
Figure 13:
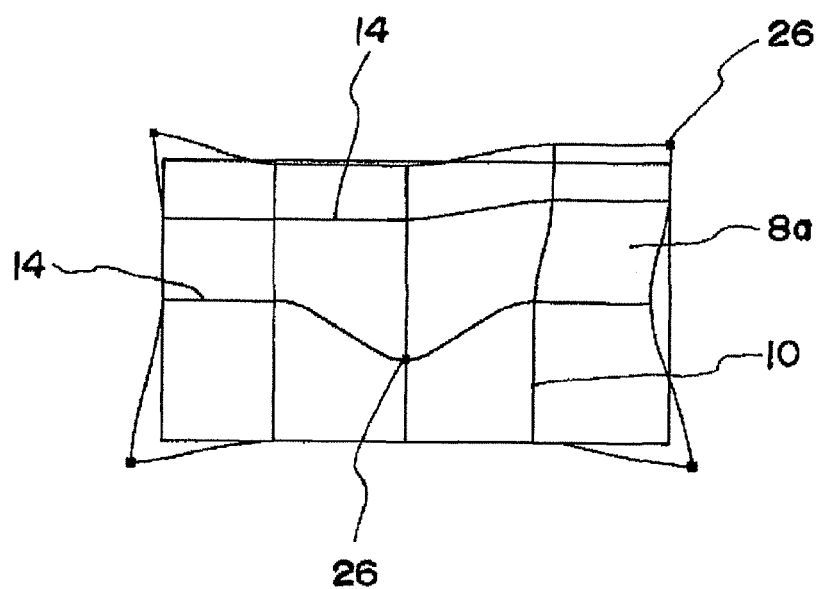
FIG. 13 illustrates the present invention.

Next, as shown in FIG. 13, the printing density control point 26 at the center or each corner of the campus screen 8*a* is dragged and moved to edit the printing density control lines 10 and 14. As a result, the printing density control lines 10 and 14 as well as the gradation pattern are updated (Step S13). As shown in FIG. 8, the campus screen 8*a* and the cross section line display screens 34 and 36 can display the grid 38. By displaying the grid, a grid point can be snapped in each editing operation.

Calculating all pixels in a pixel processing may cause a delayed response. To prevent this, this program uses image interpolation to limit pixels to be calculated. Prepared image data is converted by the image output format generation means 32 to have a data format for image output. The prepared image data is printed by the image printing means 46 (Step S14).

As is clear from the above description, the vertical and horizontal printing density control line generation means 12 and 16, the vertical and horizontal printing density control line cross section line generation means 20 and 24, the printing density control point generation means 28, and the printing density control point shift means 42 constitute a cross section line editing means. The operator can use this cross section line editing means to adjust the point and handle of the printing density control point so that the cross section lines 18 and 22 can be set to an arbitrary curve.

The color specification described in the above description specifies a color on the display screen. Thus, a color actually printed is a color prepared by the printer. White is mainly used to print a light guide plate. However, the invention is not limited to this. Other colors capable of providing reflection such as yellow also can be used.

DESCRIPTION OF REFERENCE NUMERALS

2 Campus generation means
4 Printing density control point color setting dialogue
6 Printing density control point color setting means
8 Campus
8a Campus screen
10 Vertical printing density control line
12 Vertical printing density control line generation means
14 Horizontal printing density control line
16 Horizontal printing density control line generation means
18 Cross section line
20 Cross section line generation means
22 Cross section line
24 Cross section line generation means
26 Printing density control point
28 Printing density control point generation means
30 Image interpolation means
32 Format generation means
34 Cross section line display screen
36 Cross section line display screen
38 Grid
40 Grid display means
42 Printing density control point shift means
44 Input/output interface section
46 Image printing means
48 Control section
50 Printing density control point
52 Printing density control point

What is claimed is:

1. A non-transitory computer-readable recording medium having stored thereon a gradation pattern preparation program to prepare a printable gradation pattern on a campus region set on a computer screen, wherein, when executed, the program causes a computer to function as:

a campus setting means for defining a region on which the gradation pattern is prepared, a vertical and horizontal printing density control line generation means for displaying, on a campus face, vertical and horizontal printing density control lines in a net-like manner, a vertical cross section line generation means for displaying a cross section image of a selected vertical printing density control line as a vertical cross section line on a vertical cross section line display screen, a horizontal cross section line generation means for displaying a cross section image of a selected horizontal printing density control line as a horizontal cross section line on a horizontal cross section line display screen, a printing density control point generation means for displaying, on the respective vertical and horizontal cross section lines, printing density control points for editing the respective vertical and horizontal cross section lines, and a printing density control point shift means for changing, in accordance with a shift of the printing density control points, heights of reference lines of the respective vertical and horizontal cross section lines.

2. The non-transitory computer-readable recording medium according to claim 1, wherein the heights of the reference lines of the respective vertical and horizontal cross section lines define color shading of a gradation pattern along corresponding vertical and horizontal printing density control lines.

3. The non-transitory computer-readable recording medium according to claim 1, wherein the printing density control points function as a reference point by which color shading can be specified on the respective vertical and horizontal cross section lines, and a handle is provided that can be moved in an up-and-down direction with reference to a corresponding reference line.

* * * * *